US012665863B2

(12) United States Patent
Lin

(10) Patent No.: US 12,665,863 B2
(45) Date of Patent: Jun. 23, 2026

(54) METHOD FOR FORWARDING DATA PACKET, ELECTRONIC DEVICE, AND STORAGE MEDIUM FOR THE SAME

(71) Applicant: Ruijie Networks Co., Ltd., Fuzhou (CN)

(72) Inventor: Junjie Lin, Fuzhou (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 252 days.

(21) Appl. No.: 18/317,969

(22) Filed: May 16, 2023

(65) Prior Publication Data

US 2023/0283578 A1 Sep. 7, 2023

Related U.S. Application Data

(63) Continuation of application No. PCT/CN2022/134231, filed on Nov. 25, 2022.

(30) Foreign Application Priority Data

Dec. 20, 2021 (CN) .......................... 202111558739.0

(51) Int. Cl.
*H04L 49/90* (2022.01)
*H04L 47/10* (2022.01)
(52) U.S. Cl.
CPC .............. *H04L 49/90* (2013.01); *H04L 47/39* (2013.01)
(58) Field of Classification Search
None
See application file for complete search history.

(56) References Cited

U.S. PATENT DOCUMENTS 6,850,999 B1 2/2005 Mak et al.
2002/0176430 A1 11/2002 Sangha et al.
(Continued)

FOREIGN PATENT DOCUMENTS

CN 102571559 A 7/2012
CN 113382442 A 9/2021
(Continued)

OTHER PUBLICATIONS

International Search Report and Written Opinion received for PCT Patent Application No. PCT/CN2022/134231, mailed on Feb. 15, 2023, 14 pages (6 pages of English Translation and 8 pages of Original Document).
(Continued)

*Primary Examiner* — Kouroush Mohebbi
(74) *Attorney, Agent, or Firm* — ArentFox Schiff LLP; Michael Fainberg

(57) ABSTRACT

The present application provides a method for forwarding a data packet, and an electronic device and a non-volatile computer-readable storage medium therefor. The method includes: receiving a target data packet including first address information; acquiring a storage status of a packet queue corresponding to the target data packet, wherein the packet queue is adapted to store data packets with address information consistent with the first address information; storing, when the storage status is determined as a first state, the target data packet into a first-class block storage space corresponding to a low latency queue, wherein the first state represents a non-congestion state; and forwarding, when a first condition is met, a first data packet stored in the first class block storage space.

18 Claims, 7 Drawing Sheets

(56)                    References Cited

U.S. PATENT DOCUMENTS

2002/0191622  A1*  12/2002  Zdan ..................... H04L 45/308
                                                    370/468
2013/0128896  A1      5/2013  Munoz
2016/0301614  A1*  10/2016  Concer  .............. H04L 47/2441
2017/0005953  A1      1/2017  Bracha et al.
2017/0366476  A1    12/2017  Sweeney et al.

FOREIGN PATENT DOCUMENTS

CN             113454957  A       9/2021
CN             114257559  A       3/2022
WO         2017/167674  A1    10/2017
WO         2021/128104  A1      7/2021

OTHER PUBLICATIONS

Notice to Grant received for Chinese Patent Application No. 202111558739.0, mailed on May 19, 2023, 7 pages (2 pages of English Translation and 5 pages of Original Document).

* cited by examiner

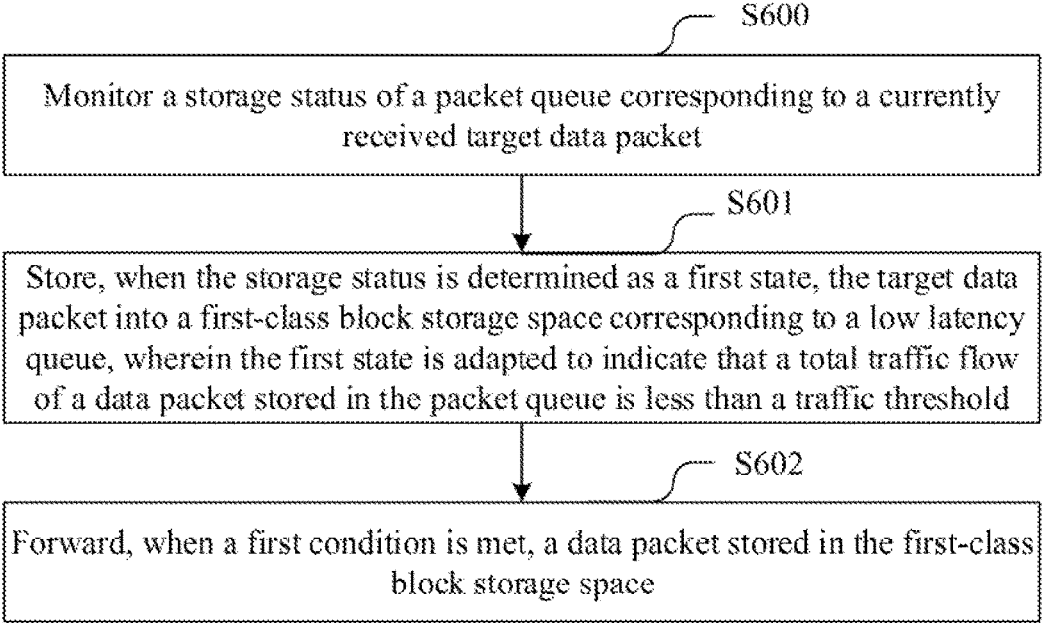

S600

Monitor a storage status of a packet queue corresponding to a currently received target data packet

S601

Store, when the storage status is determined as a first state, the target data packet into a first-class block storage space corresponding to a low latency queue, wherein the first state is adapted to indicate that a total traffic flow of a data packet stored in the packet queue is less than a traffic threshold

S602

Forward, when a first condition is met, a data packet stored in the first-class block storage space

FIG. 6

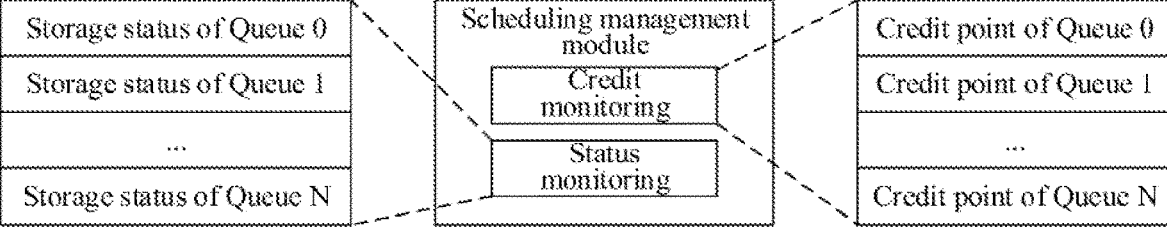

| Storage status of Queue 0 |
| Storage status of Queue 1 |
| ... |
| Storage status of Queue N |

| Scheduling management module |
| Credit monitoring |
| Status monitoring |

| Credit point of Queue 0 |
| Credit point of Queue 1 |
| ... |
| Credit point of Queue N |

FIG. 7

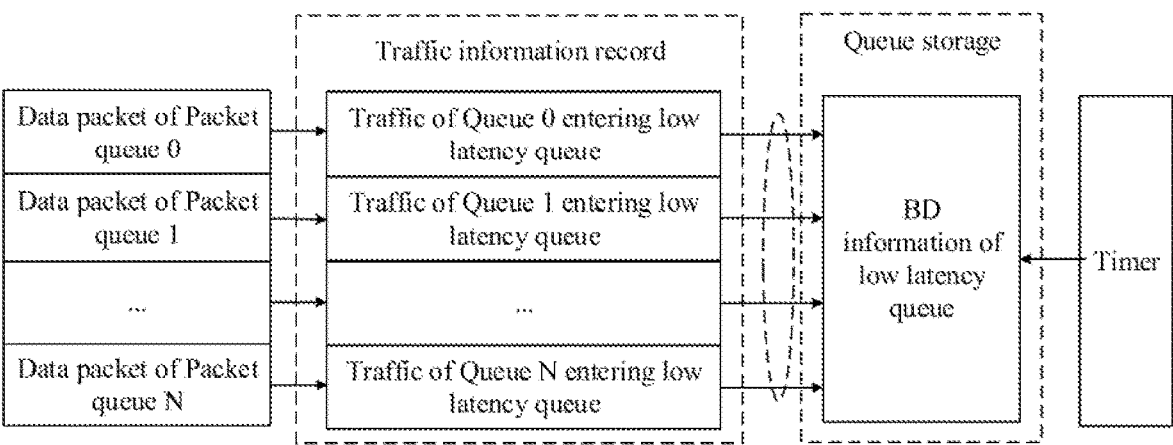

FIG. 8

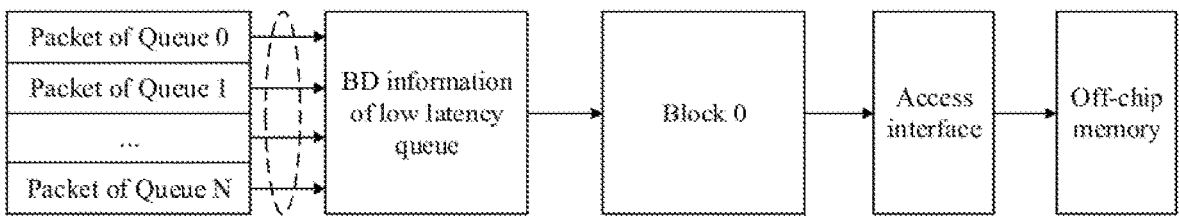

FIG. 9

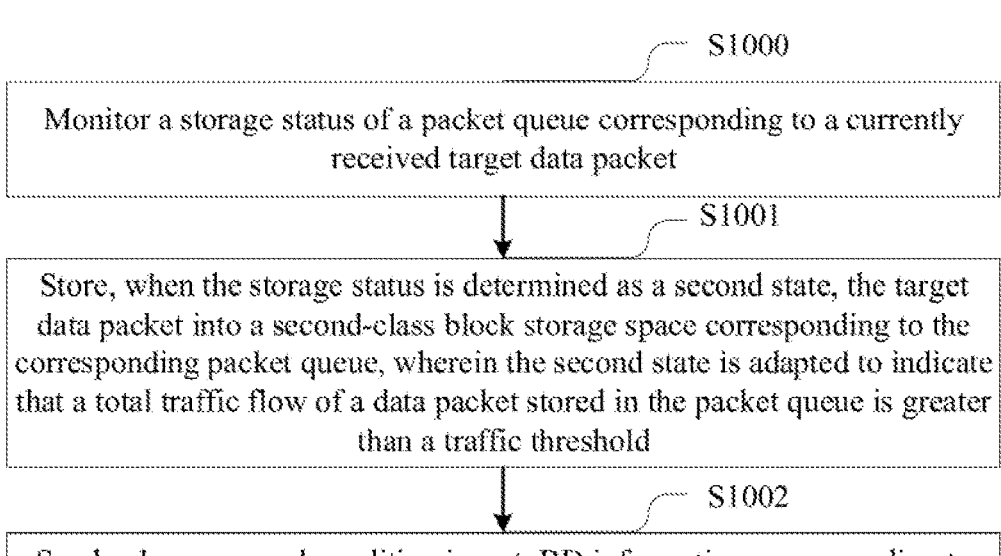

S1000

Monitor a storage status of a packet queue corresponding to a currently received target data packet

S1001

Store, when the storage status is determined as a second state, the target data packet into a second-class block storage space corresponding to the corresponding packet queue, wherein the second state is adapted to indicate that a total traffic flow of a data packet stored in the packet queue is greater than a traffic threshold

S1002

Send, when a second condition is met, BD information corresponding to the second-class block storage space, to forward a data packet stored in the second-class block storage space

FIG. 10

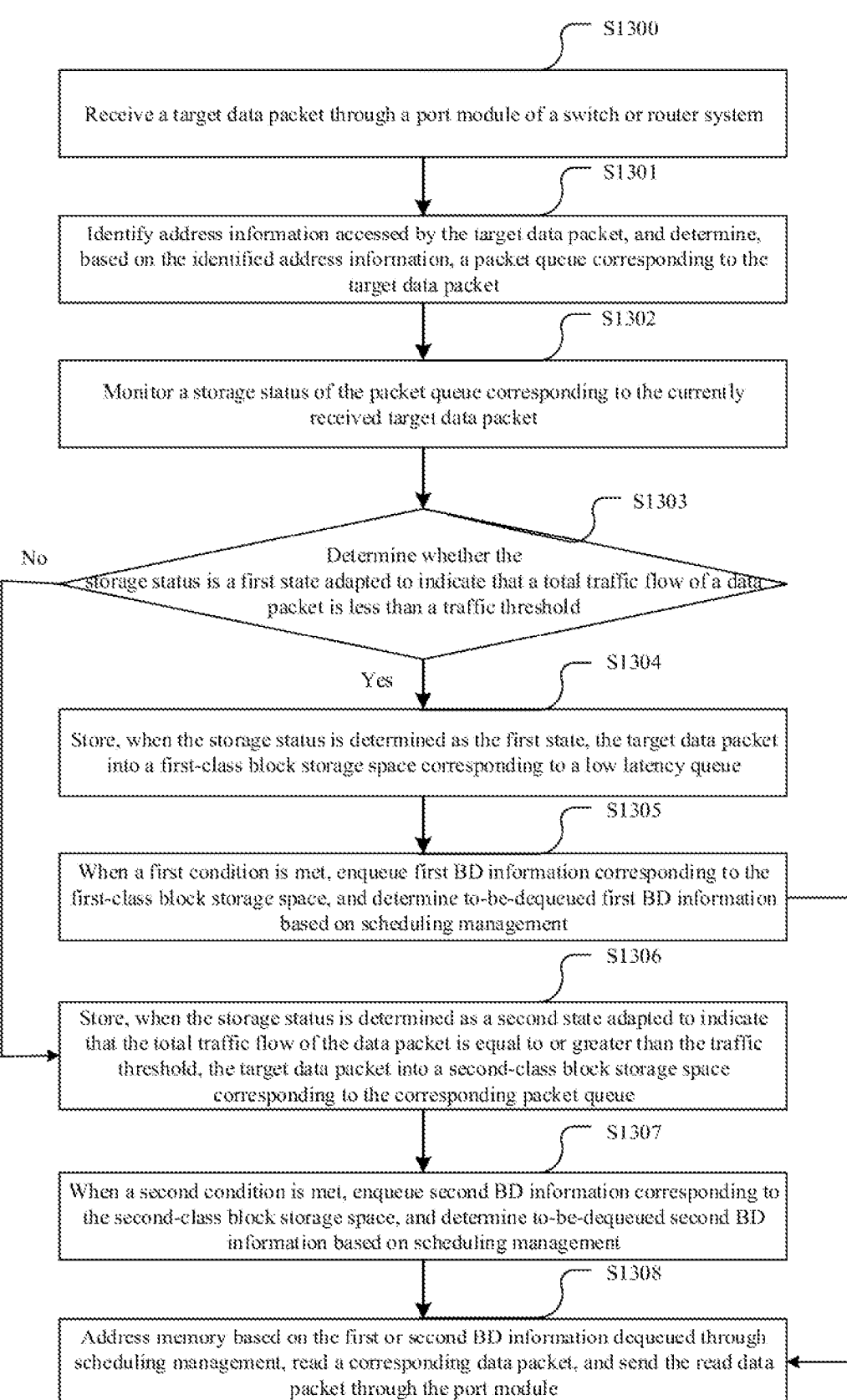

S1300

Receive a target data packet through a port module of a switch or router system

S1301

Identify address information accessed by the target data packet, and determine, based on the identified address information, a packet queue corresponding to the target data packet

S1302

Monitor a storage status of the packet queue corresponding to the currently received target data packet

S1303

Determine whether the storage status is a first state adapted to indicate that a total traffic flow of a data packet is less than a traffic threshold No Yes

S1304

Store, when the storage status is determined as the first state, the target data packet into a first-class block storage space corresponding to a low latency queue

S1305

When a first condition is met, enqueue first BD information corresponding to the first-class block storage space, and determine to-be-dequeued first BD information based on scheduling management

S1306

Store, when the storage status is determined as a second state adapted to indicate that the total traffic flow of the data packet is equal to or greater than the traffic threshold, the target data packet into a second-class block storage space corresponding to the corresponding packet queue

S1307

When a second condition is met, enqueue second BD information corresponding to the second-class block storage space, and determine to-be-dequeued second BD information based on scheduling management

S1308

Address memory based on the first or second BD information dequeued through scheduling management, read a corresponding data packet, and send the read data packet through the port module

METHOD FOR FORWARDING DATA PACKET, ELECTRONIC DEVICE, AND STORAGE MEDIUM FOR THE SAME

CROSS-REFERENCE TO RELATED APPLICATION

This application is a continuation of International Patent Application No. PCT/CN2022/134231 filed on Nov. 25, 2022, which claims priority to Chinese Patent Application No. 202111558739.0, filed with the China National Intellectual Property Administration on Dec. 20, 2021 and entitled "METHOD FOR FORWARDING DATA PACKET AND APPARATUS THEREFOR", both of which are incorporated herein by reference in their entireties.

TECHNICAL FIELD

Embodiments of the present application relate to the field of communication technologies, and in particular, to a method for forwarding a data packet, and an electronic device and a non-volatile computer-readable storage medium therefor.

BACKGROUND

In a communication process, the forwarding of a data packet needs to use a switch or router system. A buffer management mechanism in the switch or router system buffers the received data packet, and forwards the buffered data packet when a specific condition is met.

After receiving the data packet, the switch or router system buffers the data packets by storage queues, and each packet queue corresponds to one block storage space. A data packet is stored in the corresponding packet queue, that is, the packet data are stored in the corresponding block storage space, and a data packet stored in the block storage space is forwarded when the block storage space is fully filled or filled to be not capable of storing any further complete data packet. Since each data packet has a corresponding traffic flow, longer is the time in which the size of the data packets accumulated into the block storage space reaches the size of the block storage space, and longer is the time that the data packet already stored in the block storage space waits for sending. In one word, a high transmission delay occurs when a data packet is forwarded by an existing switch or router system.

SUMMARY

The present application provides a method for forwarding a data packet, and an electronic device and a non-volatile computer-readable storage medium therefor, to reduce a transmission delay.

The present application provides a method for forwarding a data packet, including: receiving a target data packet including first address information; acquiring a storage status of a packet queue corresponding to the target data packet, wherein the packet queue is adapted to store data packets with address information consistent with the first address information; storing, when the storage status is determined as a first state, the target data packet into a first-class block storage space corresponding to a low latency queue, wherein the first state represents a non-congestion state; and forwarding, when a first condition is met, a first data packet stored in the first class block storage space. The first data packet may include the target data packet or not.

In a possible implementation, the low latency queue is adapted to store data packets having different address information.

In a possible implementation, the first-class block storage space is allocated on an off-chip buffer.

In a possible implementation, the step of storing, when the storage status is determined as the first state, the target data packet into the first-class block storage space corresponding to the low latency queue, further includes: storing a data packet of the packet queue into the first-class block storage space.

In a possible implementation, the step of acquiring the storage status of the packet queue, includes: detecting the storage status of the packet queue; and updating the storage status of the packet queue.

In a possible implementation, the step of detecting the storage status of the packet queue, includes: monitoring, on schedule, the storage status of the packet queue.

In a possible implementation, the step of monitoring, on schedule, the storage status of the packet queue, includes: calculating a target credit point of the packet queue, wherein the target credit point is related to a forwarding rate of the packet queue; and determining, based on the target credit point, the storage status of the packet queue.

In a possible implementation, the step of calculating the target credit point of the packet queue, includes: determining a first credit point allocated to the packet queue; determining, when a data packet in the packet queue is forwarded, a second credit point based on a traffic flow of the forwarded data packet; and calculating the target credit point based on the first credit point and the second credit point.

In a possible implementation, the step of monitoring, on schedule, the storage status of the packet queue, includes: monitoring a remaining queue length of the packet queue; and updating, based on the remaining queue length, the storage status of the packet queue corresponding to the target data packet.

In a possible implementation, the non-congestion state includes a state where a total traffic flow of data packets stored in the packet queue is less than a traffic threshold.

In a possible implementation, the step of forwarding, when the first condition is met, the first data packet stored in the first-class block storage space, includes: when a total traffic flow of data packets stored in the first-class block storage space is equal to or greater than a first threshold, forwarding the first data packet.

In a possible implementation, the step of forwarding, when the first condition is met, the first data packet stored in the first-class block storage space, includes: forwarding, on schedule, the first data packet stored in the first-class block storage space.

In a possible implementation, the step of forwarding, when the first condition is met, the first data packet stored in the first-class block storage space, includes: detecting first buffer description BD information corresponding to the low latency queue; and when the first BD information is determined as valid, forwarding the first data packet stored in the first-class block storage space.

In a possible implementation, the method further includes: storing, when the storage status is determined as a second state, the target data packet into a second-class block storage space corresponding to the packet queue, wherein the second state represents a congestion state; and forwarding, when a second condition is met, a second data packet stored in the second-class block storage space. The second data packet may include the target data packet or not.

In a possible implementation, the step of forwarding, when the second condition is met, the second data packet stored in the second-class block storage space, includes: when a total traffic flow of data packets stored in the second-class block storage space is equal to or greater than a second threshold, forwarding the second data packet stored in the second-class block storage space.

In a possible implementation, the step of forwarding, when the second condition is met, the second data packet stored in the second-class block storage space, includes: when the storage status of the packet queue is determined as being switched from the second state to the first state, forwarding the second data packet stored in the second-class block storage space.

In a possible implementation, the first-class block storage space is not greater than the second-class block storage space.

In a possible implementation, the congestion state includes a state where a total traffic flow of data packets stored in the packet queue is greater than or equal to a traffic threshold.

The present application provides a method for forwarding a data packet. The method includes: monitoring a storage status of a packet queue corresponding to a currently received target data packet, where the packet queue is adapted to store a data packet consistent with address information accessed by the target data packet; storing, when it is determined that the storage status is a first state, the target data packet in first-class block storage space corresponding to a low latency queue, where the first state is adapted to indicate that total traffic of the data packet stored in the packet queue is less than a traffic threshold; and forwarding, when a first condition is met, a data packet stored in the first-class block storage space.

In this embodiment of the present application, after the target data packet is received, the packet queue corresponding to the target data packet is determined, and the storage status corresponding to the packet queue is monitored. When the storage status is determined as the first state, the total traffic flow of the data packets instantaneously stored in the packet queue corresponding to the target data packet is small. When the target data packet is stored into the packet queue, since the packet queue is adapted to store the data packets with the address information consistent with the address information accessed by the target data packet, a specific waiting time is required for the total traffic flow of the data packets to meet a forwarding condition for the data packets, thereby resulting in a data-packet transmission delay. Therefore, when the storage status of the packet queue corresponding to the target data packet is determined as the first state, the target data packet is stored in the first-class block storage space corresponding to the low latency queue. The low latency queue is adapted to store data packets with address information consistent with and/or inconsistent with the address information accessed by the target data packet. Therefore, the total traffic flow of the data packets can quickly meet the forwarding condition for the data packets. In addition, the data packets stored in the first-class block storage space are forwarded when the forwarding condition is met, thereby reducing the data-packet transmission delay.

In a possible implementation, the monitoring a storage status of a packet queue corresponding to a currently received target data packet includes: monitoring a target credit point of the packet queue, and determining, based on the target credit point, the storage status of the packet queue corresponding to the target data packet, where the target credit point is adapted to indicate a forwarding rate for forwarding a data packet; or monitoring a remaining queue length of the packet queue, and determining, based on the remaining queue length, the storage status of the packet queue corresponding to the target data packet.

In this embodiment of the present application, two implementations for monitoring the storage status of the packet queue are provided, to accurately determine the storage status of the packet queue, and determine, based on the storage status, a block storage space into which the target data packet is to be stored, thereby reducing the data-packet transmission delay.

In a possible implementation, the monitoring a target credit point of the packet queue includes: for the packet queue, determining a first credit point allocated to the packet queue, and determining, when the data packet corresponding to the packet queue is forwarded, a to-be-deducted second credit point based on the total traffic flow of the forwarded data packet; and determining the target credit point based on the first credit point and the second credit point.

In this embodiment of the present application, an implementation for monitoring the target credit point of the packet queue is provided, to determine the target credit point of the packet queue. The storage status of the packet queue is further determined based on the target credit point.

In a possible implementation, the forwarding, when a first condition is met, a data packet stored in the first-class block storage space includes: when a total traffic flow of data packets stored in the first-class block storage space is equal to or greater than a first threshold, forwarding the data packet stored in the first-class block storage space; or detecting, on schedule, first buffer description (BD) information corresponding to the low latency queue, and after it is determined that the first BD information is valid, forwarding the data packet stored in the first-class block storage space.

In this embodiment of the present application, a specific case forwarding the data packet stored in the first-class block storage space is provided, to forward the data packets stored in the first-class block storage space in time, thereby reducing the data-packet transmission delay.

In a possible implementation, the method further includes: storing, when it is determined that the storage status is a second state, the target data packet in second-class block storage space corresponding to the corresponding packet queue, where the second state is adapted to indicate that the total traffic of the data packet stored in the packet queue is greater than or equal to the traffic threshold; and sending, when a second condition is met, second BD information corresponding to the second-class block storage space, to forward the data packet stored in the second-class block storage space.

In this embodiment of the present application, when the storage status of the packet queue is determined as the second state, the total traffic flow of the data packets instantaneously stored in the packet queue corresponding to the target data packet is greater than an expected to-be-scheduled traffic flow. Therefore, the target data packet is stored into the second-class block storage space corresponding to a corresponding packet queue, to buffer the packet queue. In addition, the second BD information corresponding to the second-class block storage space is sent out when the second condition is met, and then a scheduling management module determines whether to forward the data packets stored in the second-class block storage space.

5

In a possible implementation, the sending, when a second condition is met, second BD information corresponding to the second-class block storage space, to forward the data packet stored in the second-class block storage space includes: when a total traffic flow of data packets stored in the second-class block storage space is equal to or greater than a second threshold, sending the second BD information corresponding to the second-class block storage space, to forward the data packet stored in the second-class block storage space; or when it is determined that the storage status of the packet queue is switched from the second state to the first state, sending the second BD information corresponding to the second-class block storage space, to forward the data packet stored in the second-class block storage space.

In this embodiment of the present application, a specific case forwarding the data packet stored in the second-class block storage space is provided, to forward the data packets stored in the second-class block storage space in time, thereby reducing the data-packet transmission delay.

In a possible implementation, the first-class block storage space is not greater than the second-class block storage space.

In this embodiment of the present application, a size of the first-class block storage space corresponding to the low latency queue is not greater than a size of the second-class block storage space corresponding to the packet queue. This can allow the first-class block storage space to be quickly and fully filled, thereby reducing the data-packet transmission delay.

The present application provides a data packet forwarding apparatus. The apparatus includes:

is a monitoring unit, configured to monitor a storage status of a packet queue corresponding to a currently received target data packet, where the packet queue is adapted to store a data packet consistent with address information accessed by the target data packet;

a storage unit, configured to store, when it is determined that the storage status is a first state, the target data packet in first-class block storage space corresponding to a low latency queue, where the first state is adapted to indicate that a total traffic flow of the data packet stored in the packet queue is less than a traffic threshold; and a forwarding unit, configured to forward, when a first condition is met, a data packet stored in the first-class block storage space.

The present application provides an electronic device, including a memory, a processor, and a computer program that is stored in the memory and that is capable of running on the processor, wherein when the processor executes the computer program, the steps of any one of the foregoing methods for forwarding a data packet are implemented.

The present application provides a computer-readable storage medium. The computer-readable storage medium stores a computer program executable by an electronic device, and when the program is executed on the electronic device, the electronic device performs the steps of any one of the foregoing methods for forwarding a data packet.

The present application provides a computer storage medium. The computer storage medium stores computer instructions, and when the computer instructions are executed on a computer, the computer performs the steps of any one of the foregoing methods for forwarding a data packet.

Other features and advantages of the present application are described in the specification below, and partially become apparent from the specification or are understood by implementing the present application. Objectives and other advantages of the present application may be implemented and obtained by using the structures particularly specified in the specification, the claims, and the accompanying drawings.

BRIEF DESCRIPTION OF DRAWINGS

To more clearly describe technical solutions in embodiments of the present application, the accompanying drawings that are necessarily to be used in the description of embodiments are briefly described herein. It is clear that the accompanying drawings in the following descriptions are merely partial embodiments of the present application. A person of ordinary skill in the art may further obtain other accompanying drawings based on these accompanying drawings without creative efforts.

FIG. 6 is a flowchart of a method for forwarding a data packet according to an embodiment of the present application.

FIG. 7 is a schematic diagram of monitoring a storage status based on a target credit point according to an embodiment of the present application.

FIG. 8 is a schematic diagram of bundled storage of packet queues according to an embodiment of the present application.

FIG. 9 is a schematic diagram of off-chip access for bundled storage of packet queues according to an embodiment of the present application.

FIG. 10 is a flowchart of another method for forwarding a data packet according to an embodiment of the present application.

FIG. 13 is a flowchart of a specific implementation of a method for forwarding a data packet according to an embodiment of the present application.

DESCRIPTION OF EMBODIMENTS

Figure 1:
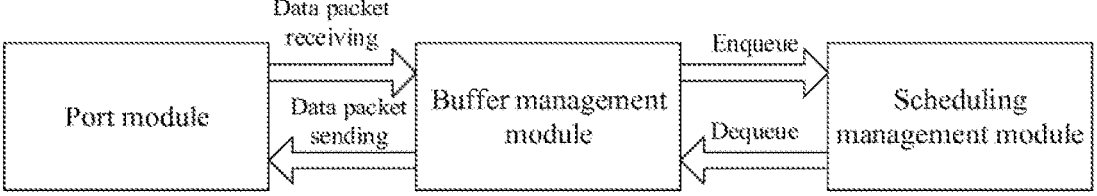
FIG. 1 is a schematic diagram of a framework of a data packet forwarding system in a related art.

To make a person skilled in the art better understand the solutions in the present application, the technical solutions in the embodiments of the present application will be clearly and thoroughly described herein with reference to the accompanying drawings in embodiments of the present application. Apparently, the embodiments described herein are merely partial rather than exhausted embodiments of the present application. All other embodiments obtained, without creative efforts, by a person of ordinary skill in the art based on the embodiments of the present application shall fall within the protection scope of the present application.

It should be noted that the terms "first", "second", and the like, in the specification, the claims, and the accompanying drawings of the present application, are used to distinguish similar objects from one another, and do not need to be used to describe a specific order or sequence. It should be understood that the data used in such way are interchangeable in applicable cases, so that the embodiments described herein in the present application can be implemented in orders other than those illustrated or described herein. In addition, the terms "include", "have", and any other variant thereof are intended to cover non-exclusive inclusions. For example, a process, method, system, product, or device that includes a series of steps or units is not necessarily limited to those steps or units that are expressly listed, but may include other steps or units that are not expressly listed or are inherent to the process, method, product, or device.

For ease of understanding, terms involved in embodiments of the present application are described as below.

Queue storage: Queue storage usually refers to storing a specific type of data packets with specific address information into the same packet queue. For example, data packets with the same Media Access Control Address (MAC) are stored in the same packet queue, data packets with the same Internet protocol (IP) address are stored in the same packet queue, or data packets with the same destination port are stored in the same packet queue.

Each normal data packet, when entering a switch or router system, is classified based on specific address information carried in the data packet. After classification is completed, the data packet is stored in a packet queue corresponding to a corresponding type, to implement a mapping relationship from the data packet to the packet queue.

After entering the switch or router system, the data packet needs to be stored and is forwarded in turn. The storage process is referred to as the queue storage. Generally, the quantity of packet queues supported by a low-end switch or router system is minimum, which supports packet queues with a quantity under the K (thousand)-level. The quantity of packet queues that may be supported by a high-end switch or router system is greater than that of the low-end switch or router system, which supports packet queues with a quantity higher than the K-level. In particular, a switch or router system used in a core device of an operator supports a quantity of packet queues greater than that of the high-end switch or router, and may support packet queues on the M (million)-level.

Data packet: A data packet is a data unit exchanged and transmitted in networks, and includes complete data information to be sent. The data packets have very different lengths, and the length is unlimited, and variable.

Buffer management: A storage unit is disposed in a switch or router system for packet queue storage. When a data packet is to be stored, a storage pointer needs to be requested, and the data packet is stored in the block storage space pointed by the storage pointer. When the data packet is to be forwarded, addressing is performed based on storage pointer information corresponding to the packet queue. The data packet stored in the block storage space is read, and the pointer is recycled for further use. The buffer management mainly includes storage space division, pointer allocation, pointer recycling, and the like.

Scheduling management: Data packets enter a switch or route system, and are stored by packet queues. Data packets in the same packet queue need to be forwarded according to the first-in-first-out principle, otherwise, resulting in a forwarding disorder. Pointers of the block storage spaces corresponding to the same packet queue form a linked list. When reading a data packet corresponding to the packet queue, the data packet is read based on the linked list. In this case, a scheduling management module determines which BD information is required to be currently dequeued through scheduling, and then a buffer management module reads the data packet based on the BD information dequeued through the scheduling.

Buffer description (Buffer Description, BD) information: Buffer description information is used to store information such as a packet storage pointer of the current packet queue, a packet quantity of the current packet queue, and a total traffic flow of the current packet queue. In embodiments of the present application, the buffer description information is classified into first BD information and second BD information based on different packet queues, where the first BD information corresponds to a low latency queue with the data packets subject to bundled storage, and the second BD information corresponds to a packet queue with the data packets subject to scatter storage.

The design concept of embodiments of the present application is briefly described as following.

Embodiments of the present application relate to the field of communication technologies, and in particular, to a method for forwarding a data packet in a switch or router system.

In a related art, a switch or router system, when forwarding a data packet, receives the data packet through a port module, and sends the received data packet to a buffer management module to buffer the data packet in a queue. In other words, data packets with the same MAC address are stored in a block storage space corresponding to the same packet queue, and data packets with the same IP address are stored in block storage space corresponding to the same packet queue.

The buffer management module generally divides system memory by blocks. Each block storage space has a fixed size (for example, a space of 16 KB), and corresponds to a BD pointer. The buffer management module is configured to record data packets in the block storage spaces and perform operations such as storing, reading, and addressing. When a block storage space corresponding to a packet queue is filled up to a fixed size or to be not capable of storing any further complete data packet, BD information corresponding to the block storage space is sent to the scheduling management module for a BD-information enqueue operation. After receiving the BD information, the scheduling management module performs a corresponding BD-information dequeue operation according to a first-in-first-out strategy, reads the BD information on which the dequeue operation is performed, and sends the read BD information to the buffer management module. The buffer management module performs addressing based on the BD information, reads the data packet and sends the data packet to the port module for sending. Referring to FIG. 1, FIG. 1 exemplarily illustrates a schematic diagram of a framework of a data-packet forwarding system in the related art.

Figure 2:
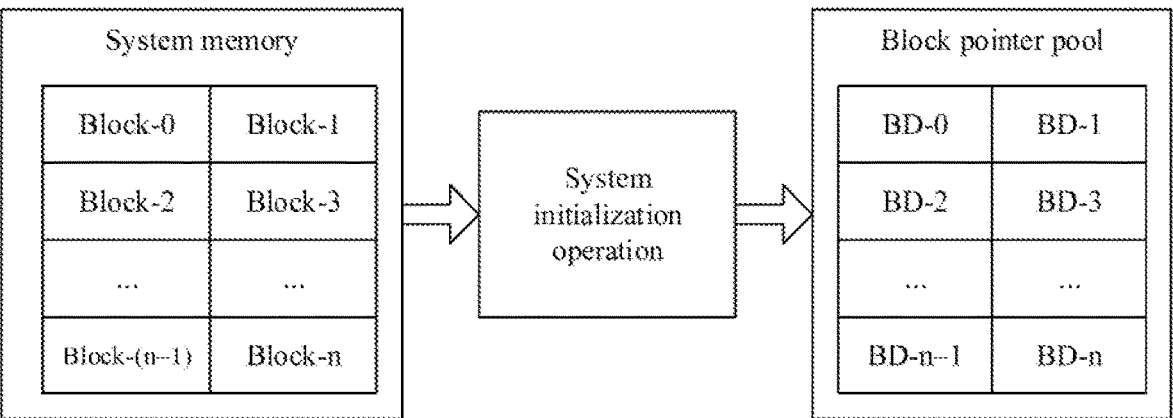
FIG. 2 is a schematic diagram of buffer initialization in a related art.

A buffer management module initializes all block storage spaces during initializing the system, and stores corresponding pointers in a pointer pool. The pointers in the pointer pool are pointer BD information available for queue storage. Referring to FIG. 2, FIG. 2 exemplarily illustrates a schematic diagram of buffer initialization.

Figure 3:
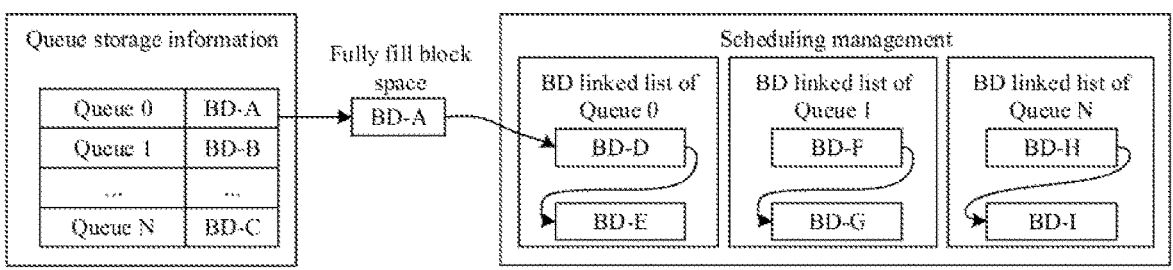
FIG. 3 is a schematic diagram of enqueuing BD information of a packet queue in a related art.

In the related art, a data packet, after entering a switch or router system, is required to be subject to queue storage. When a data packet corresponding to a new packet queue needs to be stored, a pointer is requested and extracted from the pointer pool. Each pointer points to a block storage space in a fixed size, for example, a space in a size of 16 KB. When storing data packets into the corresponding packet queue, the data packets are continuedly written into the block storage space corresponding to the packet queue. Until the block storage space is not capable of storing any further data packet, the buffer management space sends BD information corresponding to the block storage space to the scheduling management module. Referring to FIG. 3, FIG. 3 illustrates a schematic diagram of enqueuing BD information of a packet queue in the related art.

The foregoing methods for forwarding a data packet have the following problem. Only when the block storage space allocated to each packet queue is filled up to a fixed size or to be not capable of storing any further complete packet, BD information corresponding to the block storage space is sent to the scheduling management module. Consequently, a specific delay may occur in a process of forwarding a data packet. In addition, when a traffic flow of a data packet is small, longer is the time that is required to fully fill the block storage space. In other words, longer is the waiting time for the data packet to be forwarded, resulting in a higher delay in forwarding the data packet.

In a related art, a technical solution is provided for the foregoing problem. That is, an on-chip buffer is set in the buffer management module. When a traffic flow of a data packet is small, the data packet passes through an on-chip buffer path. A block size of the on-chip buffer is set to be less than that of an off-chip buffer, for example, the block size of the off-chip buffer is 16 KB, and the block size of the on-chip buffer is 512 B. Therefore, the data-packet forwarding delay may be reduced by means of setting an on-chip buffer. However, an additional on-chip buffer space has to be consumed in this manner, which increases requirements for resources of a chip or system.

In view of this, embodiments of the present application provide a method for forwarding a data packet and an apparatus therefor, to reduce a data-packet transmission delay.

In embodiments of the present application, a multi-queue low-delay buffer management mechanism is set. That is, packet data corresponding to a plurality of packet queues are bundled and stored in a low latency queue, and the multi-queue low-delay buffer management mechanism acting on the buffer management module in a switch or router system, can effectively improve data packet forwarding performance and a low delay feature of the switch or router system, thereby meeting high-performance storage and forwarding requirements of data packets, effectively improving bandwidth utilization of an off-chip buffer, and reducing resource consumption.

After the design concept of embodiments of the present application is described, an application scenario to which technical solutions of embodiments of the present application are applicable is briefly described herein. It should be noted that the application scenario described below is merely used to describe but not limit embodiments of the present application. In a specific implementation process, the technical solutions provided in embodiments of the present application may be flexibly applied based on an actual requirement.

Figure 4:
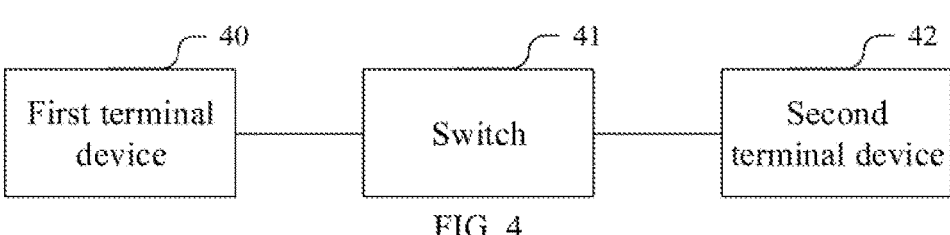
FIG. 4 is a schematic diagram of an application scenario according to an embodiment of the present application.

Referring to FIG. 4, FIG. 4 exemplarily illustrates an application scenario according to an embodiment of the present application. The application scenario includes a first terminal device 40, a switch 41, and a second terminal device 42, wherein the first terminal device 40 and the second terminal device 42 may perform data-packet transmission through the switch 41, to implement information exchange.

The following describes, with reference to the foregoing application scenario and the accompanying drawings, a method for forwarding a data packet provided in exemplary implementations of the present application. It should be noted that the foregoing application scenario is merely intended for ease of understanding of the spirit and principle of the present application. Implementations of the present application are not limited to this aspect.

To reduce a data-packet transmission delay, in this embodiment of the present application, after a data packet is received, a storage status of a packet queue corresponding to the data packet is determined first, and then whether the data packet is stored into a low latency queue or into the corresponding packet queue is determined based on the storage status.

Therefore, the low latency queue and the packet queue are provided in a buffer management module in a switch or router system provided in this embodiment of the present application.

Figure 5:
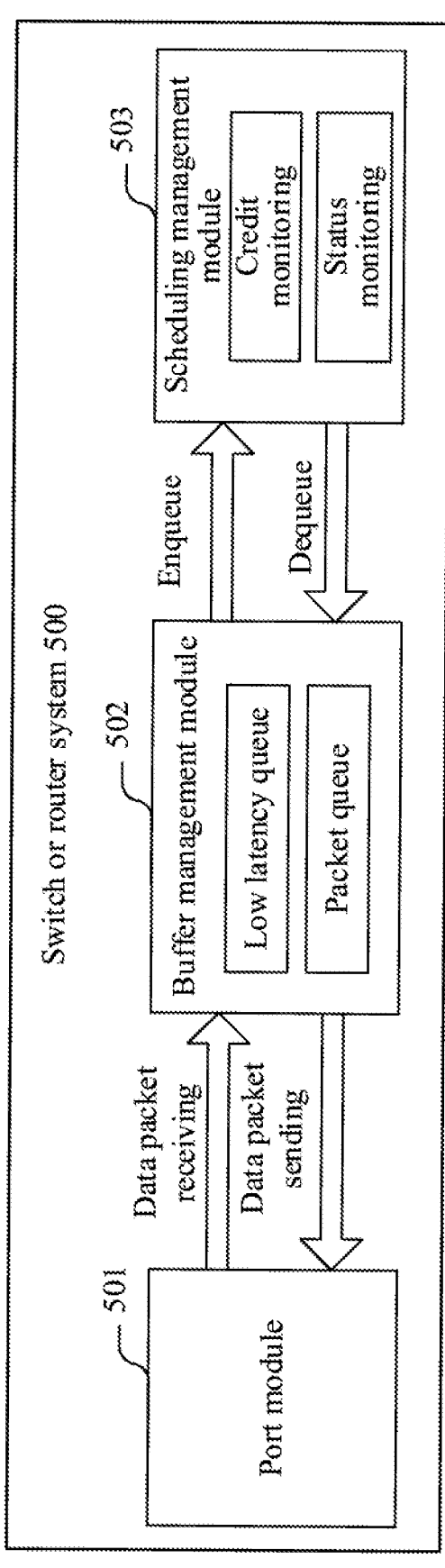
FIG. 5 is a schematic diagram of an architecture of a switch or router system according to an embodiment of the present application.

Referring to FIG. 5, FIG. 5 exemplarily illustrates a schematic diagram of an architecture of a switch or router system 500 according to an embodiment of the present application. The switch or router system 500 includes a port module 501, a buffer management module 502, and a scheduling management module 503.

The port module 501 is configured to receive and send a data packet.

The buffer management module 502 is configured to manage storage memory of the switch or router system, store the data packet, and form BD information of a storage queue. In addition, storage queues in two states are set in the buffer management module 502: a low latency queue and a packet queue. BD information of the low latency queue is referred to as first BD information, and BD information of the packet queue is referred to as second BD information. The low latency queue is adapted to store various data packets stored when the packet queue is in a first state, where the various data packets include data packets with consistent and/or inconsistent access address information. The packet queue is adapted to store a data packet with address information consistent with address information accessed by a received target data packet.

The scheduling management module 503 is configured to: perform an enqueue operation on the second BD information currently corresponding to the packet queue; select, from a second BD information linked list corresponding to the packet queue according to a first-in-first-out principle, the second BD information that is first enqueued, and dequeue the selected second BD information through scheduling; and set credit monitoring and status monitoring in the scheduling management module 503, to monitor a target credit point of the packet queue in real time, and switch the storage status of the packet queue based on the target credit point of the packet queue.

Based on the architecture of the above-mentioned switch or router system 500, an embodiment of the present application provides a method for forwarding a data packet. Referring to FIG. 6, FIG. 6 exemplarily illustrates a flowchart of the method forwarding a data packet according to an embodiment of the present application. The method includes the following steps.

In Step S600, a storage status of a packet queue corresponding to a currently received target data packet is monitored.

The packet queue is adapted to store a data packet with address information consistent with address information accessed by the target data packet.

In this embodiment of the present application, the storage status of the packet queue corresponding to the currently received target data packet is monitored based on at least one of a target credit point and a remaining queue length that correspond to the packet queue.

The following respectively describes the monitoring of the storage status of the packet queue based on the target credit point and based on the remaining queue length in detail.

Manner 1: The storage status of the packet queue is monitored based on the target credit point.

In a possible implementation, the target credit point of the packet queue is monitored by the scheduling management module in the switch or route management system, and the storage status of the packet queue corresponding to the target data packet is determined based on the target credit point. The target credit point is determined based on a first credit point allocated to the packet queue and a to-be-deducted second credit point determined, when the data packet corresponding to the packet queue is forwarded, based on a total traffic flow of the forwarded data packet. For example, the target credit point is calculated by deducting the second credit point from the first credit point. The target credit point is adapted to indicate a forwarding rate for forwarding a data packet.

Referring to FIG. 7, FIG. 7 exemplarily illustrates a schematic diagram of monitoring the storage status based on the target credit point according to an embodiment of the present application. Credit monitoring and storage status monitoring functions are set, to determine the storage status of the packet queue. Because a storage status of each packet queue is monitored in the same manner, only one packet queue is used as an example for description in this embodiment of the present application.

In this embodiment of the present application, a first credit point is periodically allocated to each packet queue, the credit point is deducted, when a data packet corresponding to the packet queue is forwarded, based on a total traffic flow of the forwarded data packet, and a to-be-deducted second credit point is determined. A target credit point is determined based on the allocated first credit point and the to-be-deducted second credit point deducted when the data packet is forwarded; and the storage status of the packet queue is then determined based on the target credit point.

It should be noted that the first credit point may be set or adjusted by the system according to the requirements for the transmission delay, but it may also be set or adjusted by user.

Generally, a credit point threshold is set, and the target credit point is compared with the credit point threshold. When the target credit point is greater than the credit point threshold, a rate at which the packet queue forwards the data packets is low, that is, the total traffic flow of the currently stored data packet is small. Therefore, the storage status is a first state.

On the contrary, when the target credit point is less than the credit point threshold, the rate at which the packet queue forwards the data packet is high, that is, the total traffic flow of the currently stored data packets is large. Therefore, the storage status is a second state.

For example, the credit point threshold is set to 0, and a first credit point is allocated periodically per 1 millisecond at a rate of 100 Mbps. In this way, the first credit point is allocated by 0.1 Mb per millisecond. If the forwarding rate of the data packet reaches 1000 Mbps in this case, the second credit point of 1 Mb is deducted per millisecond, that is, an amount of the deducted second credit points is greater than an amount of the allocated first credit point, the target credit point is quickly deducted to a negative value state. In this case, the storage status of the packet queue is determined as the second state. When the forwarding rate of the data packet is less than 100 Mbps, and the second credit point deducted approximately per millisecond is less than 0.1 Mb, where the target credit point of the packet queue may not become a negative number, the packet queue is then determined as being in the first state.

Manner 2: The storage status of the packet queue is monitored based on the remaining queue length.

In a possible implementation, the remaining queue length of the packet queue is monitored by the scheduling management module in the switch or route management system, and the storage status of the packet queue corresponding to the target data packet is determined based on the remaining queue length.

Generally, a queue length threshold is set, and the remaining queue length is compared with the queue length threshold. When the remaining queue length is greater than the queue length threshold, the total traffic flow of the currently stored data packet is small. Therefore, the storage status is the first state.

On the contrary, when the remaining queue length is less than the queue length threshold, the total traffic flow of the currently stored data packets is large. Therefore, the storage status is the second state.

In Step S601, when the storage status is determined as the first state, the target data packet is stored into a first-class block storage space corresponding to a low latency queue, where the first state is adapted to indicate that a total traffic flow of the data packets stored in the packet queue is less than a traffic threshold.

Because the switch or route management system continuedly receives data packets, each time a data packet is received, the storage status of the packet queue corresponding to the currently received target data packet is monitored, and the currently received target data packet is stored based on the storage status.

Generally, when the packet queue corresponding to the currently received target data packet is determined as being in the first state, the data packet is stored into the low latency queue. Therefore, data packets are continuedly stored into the low latency queue when it is monitored that the packet queue is in the first state.

In addition, received data packets may be data packets that access the same address information or data packets that access different address information. However, regardless of whether the received data packets are data packets that access the same address information or data packets that access different address information, when it is monitored that the corresponding packet queue is in the first state, the data packets are stored into the low latency queue. Therefore, the low latency queue in this embodiment of the present application is adapted to store data packets with consistent and/or inconsistent access address information.

In this embodiment of the present application, when the storage status of the packet queue is determined as the first state, the current traffic flow of the data packets in the packet queue is small, and the data packet cannot be sent in time. To ensure transmission efficiency of the data packet, the target data packet is stored into the first-class block storage space corresponding to the low latency queue.

Because the switch or router system continuedly receives target data packets, each time a target data packet is received, the storage status of the packet queue corresponding to the target data packet is monitored, and the target data packet is stored into the first-class block storage space corresponding to the low latency queue after the storage status is determined as the first state.

In an embodiment of the present application, bundled storage is performed on data packets from a plurality of packet queues, storage statuses of which are the first state. Referring to FIG. 8, FIG. 8 exemplarily illustrates a schematic diagram of the bundled storage of packet queues according to an embodiment of the present application.

Specifically, after the target data packet is received by the port module, second BD information of the corresponding packet queue is obtained through addressing by using a queue number as an index, wherein the second BD information stores information such as a packet storage pointer, a packet quantity, and a total traffic flow of the current packet queue. Therefore, a traffic flow that is bundled from the packet queue corresponding to the target data packet and that enters the low latency queue is obtained. In other words, data packets from a plurality of packet queues are bundled and stored into the first-class block storage space corresponding to the low latency queue.

Referring to FIG. 9, FIG. 9 exemplarily illustrates a schematic diagram of bundled storage of packet queues and off-chip access according to an embodiment of the present application.

When data packets from the packet queues are bundled and stored, all the packet queues correspond to the same storage block. When performing storage, the packet queues each initiate a write operation to an off-chip memory. Addresses of the write operations initiated by the packet queues are continuous because of the same storage block. As shown in FIG. 9, the addresses initiated by storing queues 0 to 3 are an address in a block 0, an address in the block 0, an address in the block 0, and an address in the block 0. In this case, access addresses are continuously combined. This is conducive to improving storage performance of the off-chip memory, improving storage and forwarding performance of the switch or router system, and reducing on-chip resource consumption.

In Step S602, when a first condition is met, a data packet stored in the first-class block storage space is forwarded.

In a possible implementation, when a total traffic flow of data packets stored in the first-class block storage space is equal to or greater than a first threshold, the data packet stored in the first-class block storage space is forwarded; or
  when the remaining space of the first-class block storage space is not capable of storing any further complete data packet, the data packet stored in the first-class block storage space is forwarded.

Specifically, when the storage status is the first state, after a port receives the data packet, a traffic flow that is bundled from corresponding queues and enters the low latency queue is obtained through addressing by using a queue number as an index, to perform an accumulation operation, that is, after a total traffic flow stored in the first-class block storage space is determined and a traffic flow of the corresponding queue enters the low latency queue, the storing operation of the corresponding packet queue is not performed based on the queue number, and the traffic flow of the corresponding queue directly enters the low latency queue for storage. After the total traffic flow exceeds a fixed threshold, for example, of 16 KB, or the remaining space cannot store a complete data packet, first BD information corresponding to the low latency queue is sent to the scheduling management module, wherein the first BD information is enqueued, and a dequeue operation is performed immediately without performing strategic dequeue by the scheduling module, that is, the enqueued first BD information is consistent with the dequeued first BD information. After the to-be-dequeued first BD information is determined, memory is addressed based on the dequeued first BD information, and the data packets stored in the first-class block storage space are read and forwarded.

It should be noted that after the total traffic flow exceeds the fixed threshold or the remaining space cannot store a complete data packet, information such as each target data packet and the packet queue corresponding to the corresponding queue number is sent to the scheduling management module, so that the scheduling management module performs deduction on a credit point of the packet queue based on the information, and further determines the storage status of the packet queue.

In another possible implementation, the first BD information corresponding to the low latency queue is detected on schedule. After the first BD information is determined as valid, the data packet stored in the first-class block storage space is forwarded.

In an embodiment, the BD information is determined as valid when the BD information is not enqueued, for example, into the scheduling management module; and the BD information is determined as invalid when the BD information is enqueued.

A bundling operation is conducive to improving a delay feature of packet forwarding, especially when a forwarding rate of data packets is low. When the forwarding rate of data packets is low, each queue needs to be independently filled into a buffer space in a size of 16 KB, to perform an enqueue operation on the first BD information and enter a forwarding process. Small traffic flows of queues are converged into a large traffic flow through the bundling operation, thereby improving a rate for filling a buffer block of 16 KB. For example, 10 packet queues, each of which is filled into a storage space of 1 KB per millisecond, require 16 milliseconds to complete filling, and then send the first BD information and enter the forwarding process. In this case, a packet delay is equal to or greater than 16 milliseconds. If the bundling operation is performed on the queues, the 10 packet queues are bundled into the same low latency queue, and a delay time is reduced from 16 milliseconds to 1.6 milliseconds.

Based on this, a timer is set for the low latency queue. As shown in FIG. 8, the timer is adapted to further improve a low delay feature, and ensure no occurrence of the remaining data packet in the data packets bundled into the low latency queue. The timer compulsorily sends the first BD information of the low latency queue to the scheduling management module at a fixed period. For example, a period of the timer is set to 10 µs. After the period of 10 µs lapsed, if the first BD information of the current low latency queue is valid, the first BD information is sent to the scheduling management module. Taking the above-mentioned 10 queues as an example, the delay is improved from 1.6 milliseconds to 10 µs.

In this embodiment of the present application, the storage status of the packet queue corresponding to the target data packet may alternatively be the second state. When the storage status is the second state, the target data packet is stored into a second-class block storage space corresponding to the corresponding data packet queue. Referring to FIG. 10, FIG. 10 exemplarily illustrates a flowchart of another method for forwarding a data packet according to an embodiment of the present application. The method includes the following steps.

In Step S1000, a storage status of a packet queue corresponding to a currently received target data packet is monitored.

It should be noted that, the implementation of Step S1000 may refer to Step S600, which will not be repeatedly described herein.

In Step S1001, when the storage status is determined a second state, the target data packet is stored into a second-class block storage space corresponding to the corresponding packet queue, wherein the second state is adapted to indicate that the total traffic flow of the data packet stored in the packet queue is greater than or equal to the traffic threshold.

In this embodiment of the present application, when the storage status of the packet queue is determined as the second state, the current traffic flow of the data packets of the packet queue is large, and the target data packet is stored into the corresponding packet queue.

Because the switch or router system continuedly receives target data packets, each time a target data packet is received, the storage status of the packet queue corresponding to the target data packet is monitored, and the target data packet is stored into the corresponding packet queue after the storage status is determined as the second state.

Figure 11:
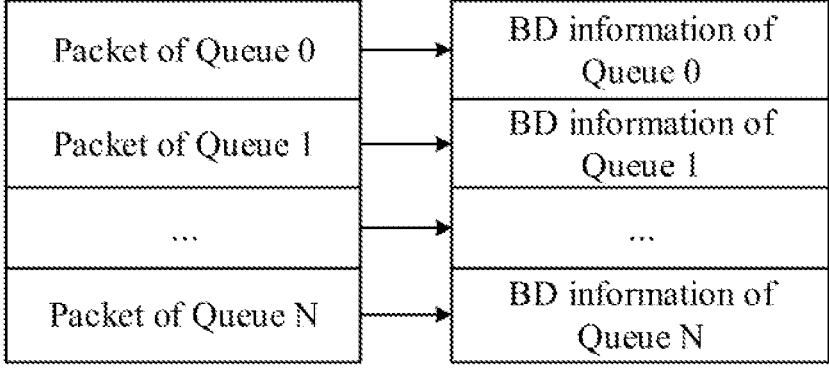
FIG. 11 is a schematic diagram of scatter storage of packet queues according to an embodiment of the present application.

Therefore, in this embodiment of the present application, scatter storage is performed on data packets of a plurality of packet queues, storage statuses of which are the second state. Referring to FIG. 11, FIG. 11 exemplarily illustrates a schematic diagram of scatter storage of packet queues according to an embodiment of the present application.

Specifically, after the target data packet is received by the port module, second BD information of a corresponding queue is obtained through addressing by using a queue number as an index. The second BD information stores information such as a packet storage pointer, a packet quantity, and a total traffic flow of the current packet queue. Each BD stores only data packets of one packet queue.

Figure 12:
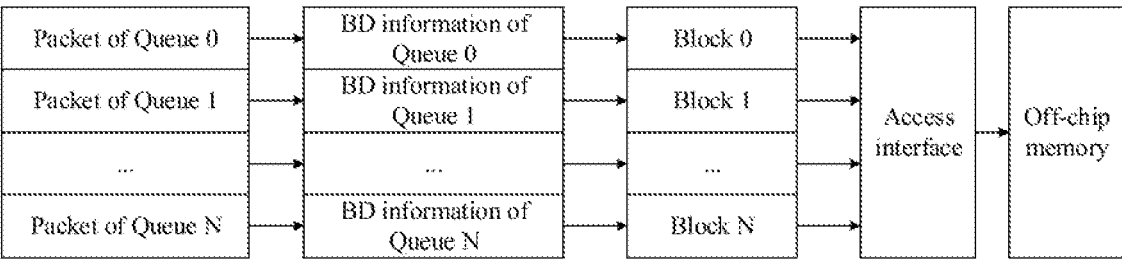
FIG. 12 is a schematic diagram of off-chip access for scatter storage of packet queues according to an embodiment of the present application.

Referring to FIG. 12, FIG. 12 exemplarily illustrates a schematic diagram of scatter storage and off-chip access of packet queues according to an embodiment of the present application.

In case that the data packets from packets queues are scatteredly storage, the storage of each packet queue corresponds to a respective storage block. When storing a packet queue, the packet queue initiates a write operation to an off-chip memory. Addresses for the write operations initiated by the queues cannot be continuous due to the different storage blocks. As shown in FIG. 12, the addresses initiated by storing queues 0 to 3 are an address in a block 0, an address in a block 1, an address in a block 2, and an address in a block 3.

In Step S1002, when a second condition is met, second BD information corresponding to the second-class block storage space is sent, to forward a data packet stored in the second-class block storage space.

In a possible implementation, when a total traffic flow of data packets stored in the second-class block storage space is equal to or greater than a second threshold, the second BD information corresponding to the second-class block storage space is sent, to forward the data packet stored in the second-class block storage space; or when remaining space of the second-class block storage space is not capable of storing any further complete data packet, the second BD information corresponding to the second-class block storage space is sent, to forward the data packet stored in the second-class block storage space.

Specifically, when the storage status is the second state, after a port receives a data packet, second BD information of a corresponding queue is obtained through addressing by using a queue number as an index. The second BD information stores information such as a packet storage pointer, a packet quantity, and a total traffic flow of the current packet queue. Each second BD stores only data packets of one packet queue, that is, the second-class block storage space corresponding to one piece of second BD information stores the data packets of the same packet queue. When a total traffic flow of the data packets stored in the second-class block storage space corresponding to each piece of second BD information exceeds a fixed threshold, for example, of 16 KB, or remaining space is not capable of storing any further complete data packet, the second BD information is sent to the scheduling management module, to enqueue the second BD information. The enqueued second BD information participates in scheduling management for strategic scheduling and dequeuing, to determine second BD information dequeued through scheduling. In this case, the enqueued second BD information is inconsistent with the dequeued second BD information. Memory is addressed based on the dequeued second BD information, and the data packet stored in the second-class block storage space corresponding to the dequeued second BD information is read and forwarded.

In case that data packets are properly input without occurring any interruption, each second-class block storage space may be completely filled, and corresponding second BD information is sent to the scheduling management module to complete subsequent processes.

When interruption of receiving data packets occurs and the second-class block storage space block is not fully filled, the second BD information cannot be sent, resulting in that a part of the data packet remains in the second-class block storage space. A related art provides a technical resolution to quickly forward a data packet for reducing remaining data, that is, an on-schedule examination mechanism is introduced, in which a timer is required to be set, to permanently examine whether a data packet is remained in block storage space. If a data packet remains for a specific time, corresponding BD information is unconditionally sent to the scheduling management module to complete the subsequent process. When a quantity of packet queues is smaller, a time required for polling all packet queues is shorter. However, when the quantity of packet queues is larger, the time required for polling is longer. Therefore, a data-packet transmission delay is related to the quantity of packet queues. In addition, when the quantity of packet queues in the system reaches a level higher than the K-level, a delay time is extended, which may reach a millisecond-level.

For the foregoing problem, in an embodiment of the present application, based on switching between the storage statuses as a trigger point, that is, when the storage status of a packet queue is switched from the second state to the first state, the second BD information is compulsorily sent to the scheduling management module.

Therefore, in a possible implementation, when a change in the storage status of the packet queue is determined, the data packet stored in the second-class block storage space is forwarded. In this case, it realizes under the scatter storage mechanism that the data packet does not remain. In addition, after the packet queue is switched to the first state, the bundled storage mechanism is adopted, by which in turn it is ensured that packet does not remain under the bundled storage.

It should be noted that the first-class block storage space may be generally set to be not greater than the second-class block storage space to reduce a waiting delay of the data packet and improve forwarding efficiency of the data packet.

Referring to FIG. 13, FIG. 13 exemplarily illustrates a flowchart of a specific implementation of a method for forwarding a data packet according to an embodiment of the present application. The method includes the following steps.

In Step S1300, a target data packet is received through a port module of a switch or router system.

In Step S1301, address information accessed by the target data packet is identified, and based on the identified address information, a packet queue corresponding to the target data packet is determined.

Generally, a data packet is stored in a packet queue, and data packets accessing same address information are stored in the same packet queue. However, in this embodiment of the present application, whether a data packet is to be stored in the corresponding packet queue is required to be determined based on the storage status of the packet queue corresponding to the data packet.

Therefore, in this embodiment of the present application, the packet queue corresponding to the target data packet should be identified first, and then the storage status of the packet queue is determined.

In Step S1302, the storage status of the packet queue corresponding to the currently received target data packet is monitored.

In Step S1303, whether the storage status is a first state adapted to indicate that a total traffic flow of a data packet is less than a traffic threshold. When the storage status is the first state adapted to indicate that the total traffic flow of the data packet is less than the traffic threshold, Step S1304 is performed; otherwise, Step S1306 is performed.

In Step S1304, when the storage status is determined as the first state, the target data packet is stored into a first-class block storage space corresponding to a low latency queue.

In a possible implementation, the target data packet is stored in the first-class block storage space corresponding to the low latency queue, that is, the target data packet is stored in the low latency queue.

In Step S1305, when a first condition is met, first BD information corresponding to the first-class block storage space is enqueued, and to-be-dequeued first BD information is determined based on scheduling management.

In a possible implementation, after the first BD information corresponding to the first-class block storage space is enqueued, the first BD information does not participate in a scheduling management strategy in a scheduling management module, but a dequeue operation is directly performed on enqueued scheduling information, that is, the enqueued first BD information is consistent with the dequeued first BD information.

In Step S1306, when the storage status is determined as a second state adapted to indicate that the total traffic flow of the data packet is greater than or equal to the traffic threshold, the target data packet is stored into a second-class block storage space corresponding to the corresponding packet queue.

In a possible implementation, the target data packet is stored in the second-class block storage space corresponding to the corresponding packet queue, that is, the target data packet is stored in the corresponding packet queue.

In Step S1307, when a second condition is met, second BD information corresponding to the second-class block storage space is enqueued, and to-be-dequeued second BD information is determined based on scheduling management.

In a possible implementation, after the second BD information corresponding to the second-class block storage space is enqueued, the second BD information participates in a first-in-first-out scheduling management strategy in the scheduling management module, to determine the to-be-dequeued second BD information. In this case, the enqueued second BD information may be inconsistent with the dequeued second BD information.

In Step S1308, memory is addressed based on the first BD information or the second BD information dequeued through scheduling management, a corresponding data packet is read, and the read data packet is sent through the port module.

It should be noted that the implementations of the foregoing embodiments may be extended to other devices or systems that need to store and forward information data by queue or class.

In an embodiment of the present application, the first-class block storage space corresponding to the low latency queue is divided from an off-chip buffer, thereby improving bandwidth utilization of off-chip buffer, and reducing on-chip resource consumption.

In addition, in an embodiment of the present application, after the target data packet is received, the packet queue corresponding to the target data packet is determined, and the storage status corresponding to the packet queue is monitored. When the storage status is determined as the first state, the total traffic flow of the data packet instantaneously stored in the packet queue corresponding to the target data packet is small. Since the packet queue is adapted to store a data packet having address information consistent with address information accessed by the target data packet, thus, when the target data packet is stored in the packet queue, the data packet is forwarded when the total traffic flow of the data packet meets a forwarding condition of the data packet, which results in a data-packet transmission delay. Therefore, when the storage status of the packet queue corresponding to the target data packet is determined as the first state, the target data packet is stored into the first-class block storage space corresponding to the low latency queue. Since the low latency queue is adapted to store a data packet having address information consistent and/or inconsistent with the address information accessed by the target data packet, the total traffic flow of the data packets can quickly meet the forwarding condition of the data packets, and the data packets stored in the first-class block storage space are forwarded when the forwarding condition is met, thereby effectively reducing a data-packet storing and forwarding delay of a multi-packet queue, and improving data-packet forwarding performance of the multi-packet queue.

Based on the same inventive concept as the embodiments of the foregoing methods of the present application, an embodiment of the present application further provides a data packet forwarding apparatus. A principle for the apparatus to resolve a problem is similar to the method in the foregoing embodiments. Therefore, the implementations of the apparatus may refer to implementations of the foregoing methods, details of which are not repeatedly described herein.

Figure 14:
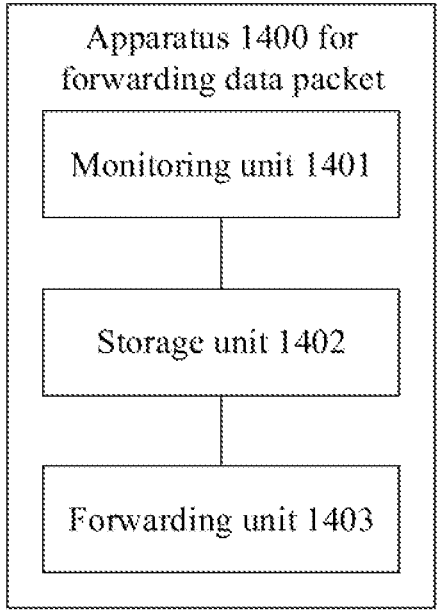
FIG. 14 is a structure diagram of a data-packet forwarding apparatus according to an embodiment of the present application.

Referring to FIG. 14, FIG. 14 exemplarily illustrates a structure view of a data packet forwarding apparatus according to an embodiment of the present application. The data packet forwarding apparatus 1400 includes a monitoring unit 1401, a storage unit 1402, and a forwarding unit 1403.

The monitoring unit 1401 is configured to monitor a storage status of a packet queue corresponding to a currently received target data packet, wherein the packet queue is adapted to store a data packet having address information consistent with address information accessed by the target data packet.

The storage unit 1402 is configured to store, when the storage status is determined as a first state, the target data packet into a first-class block storage space corresponding to a low latency queue, wherein the first state is adapted to indicate that a total traffic flow of the data packet stored in the packet queue is less than a traffic threshold.

The forwarding unit 1403 is configured to forward, when a first condition is met, a data packet stored in the first-class block storage space.

In a possible implementation, the monitoring unit 1401 is specifically configured to:

monitor a target credit point of the packet queue, and determine, based on the target credit point, the storage status of the packet queue corresponding to the target data packet, wherein the target credit point is adapted to indicate a forwarding rate for forwarding a data packet; or monitor a remaining queue length of the packet queue, and determine, based on the remaining queue length, the storage status of the packet queue corresponding to the target data packet.

In a possible implementation, the monitoring unit 1401 is specifically configured to:

for the packet queue, determine a first credit point allocated to the packet queue, and determine, when the data packet corresponding to the packet queue is forwarded, a to-be-deducted second credit point based on the total traffic flow of the forwarded data packet; and determine the target credit point based on the first credit point and the second credit point.

In a possible implementation, the forwarding unit 1403 is specifically configured to:

when a total traffic flow of data packets stored in the first-class block storage space is equal to or greater than a first threshold, forward the data packet stored in the first-class block storage space; or detect, on schedule, first BD information corresponding to the low latency queue, and after the first BD information is determined as valid, forward the data packet stored in the first-class block storage space.

In a possible implementation, the storage unit 1402 is further configured to:

store, when the storage status is determined as a second state, the target data packet in second-class block storage space corresponding to the corresponding packet queue, wherein the second state is adapted to indicate that the total traffic flow of the data packet stored in the packet queue is greater than or equal to the traffic threshold; and send, when a second condition is met, second BD information corresponding to the second-class block storage space, to forward the data packet stored in the second-class block storage space.

In a possible implementation, the forwarding unit 1403 is further configured to:

when a total traffic flow of data packets stored in the second-class block storage space is equal to or greater than a second threshold, send the second BD information corresponding to the second-class block storage space, to forward the data packet stored in the second-class block storage space; or when the storage status of the packet queue is determined as being switched from the second state to the first state, send the second BD information corresponding to the second-class block storage space, to forward the data packet stored in the second-class block storage space.

In a possible implementation, the first-class block storage space is not greater than the second-class block storage space.

For ease of description, the foregoing parts are individually described by dividing into modules (or units) by function. Certainly, the functions of the modules (or units) may be implemented in the same software or hardware or in a plurality of software or hardware when the present application is implemented.

A person skilled in the art can understand that each aspect of the present application may be implemented as a system, method, or program product. Therefore, each aspect of the present application may be specifically implemented as the following form: a complete hardware implementation, a complete software implementation (including firmware, microcode, or the like), or an implementation in which a hardware aspect and a software aspect are combined, which may be collectively referred to as a "circuit", "module", or "system" herein.

Figure 15:
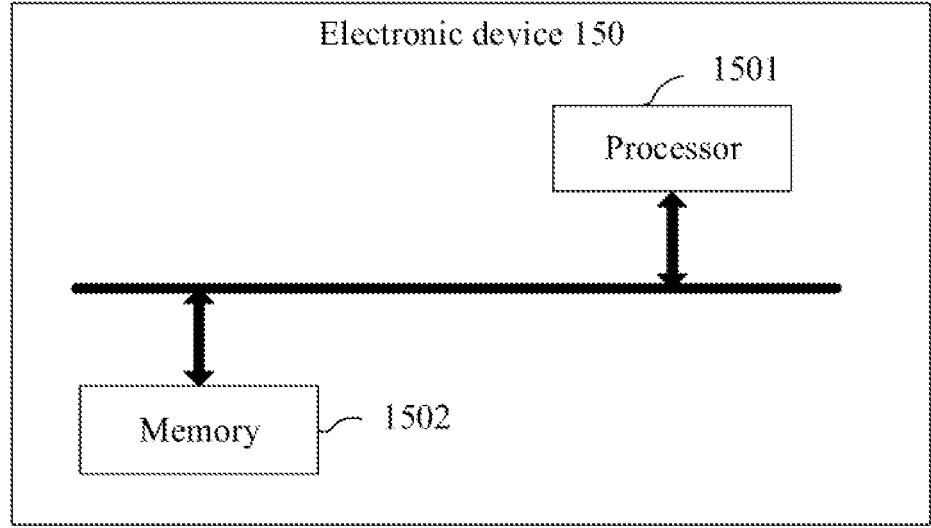
FIG. 15 is a structure diagram of an electronic device according to an embodiment of the present application.

Based on the same inventive concept as the embodiments of the foregoing methods of the present application, an embodiment of the present application further provides an electronic device 150. As shown in FIG. 15, the electronic device 150 includes at least one processor 1501 and a memory 1502 connected to the at least one processor. A specific connection medium between the processor 1501 and the memory 1502 is not limited in this embodiment of the present application. In FIG. 15, for example, the processor 1501 is connected to the memory 1502 by using a bus. The bus may be classified into an address bus, a data packet bus, a control bus, or the like.

In this embodiment of the present application, instructions executable by the at least one processor 1501 are stored in the memory 1502, and the at least one processor 1501 may execute the instructions stored in the memory 1502, to perform the steps included in the foregoing method for forwarding a data packet.

The processor 1501 is a control center of the electronic device, and may be connected with various parts of a terminal device through various interfaces and lines, and obtain a client address by running or executing the instructions stored in the memory 1502 and invoking a data packet stored in the memory 1502. Alternatively, the processor 1501 may include one or more processing units. The processor 1501 may be integrated with an application processor and a modem processor. The application processor mainly processes an operating system, locates a target interface and an application, and the like, and the modem processor mainly processes wireless communication. It may be understood that the modem processor may not be integrated into the processor 1501. In some embodiments, the processor 1501 and the memory 1502 may be implemented on the same chip. Alternatively, in some embodiments, the processor 1501 and the memory 1502 may be respectively implemented on an independent chip.

The processor 1501 may be a general purpose processor, for example, a central processing unit (CPU), a digital signal processor, an application-specific integrated circuit (Application Specific Integrated Circuit, ASIC), a field programmable gate array or another programmable logic device, a discrete gate or transistor logic device, or a discrete hardware component, which can implement or perform the method, steps, and logical block diagrams disclosed in embodiments of the present application. The general purpose processor may be a microprocessor, any conventional processor, or the like. The steps in the method disclosed with reference to embodiments of the present application may be directly performed and completed by using a hardware processor, or may be performed and completed by using a combination of a hardware module and a software module in the processor.

The memory 1502, as a non-volatile computer-readable storage medium, may be configured to store a non-volatile software program, a non-volatile computer-executable program, and a module. The memory 1502 may include at least one type of storage medium, for example, may include a flash memory, a hard disk, a multimedia card, a cassette memory, a random access memory (Random Access Memory, RAM), a static random access memory (Static Random Access Memory, SRAM), a programmable read-only memory (Programmable Read Only Memory, PROM), a read-only memory (Read Only Memory, ROM), an electrically erasable programmable read-only memory (Electrically Erasable Programmable Read-Only Memory, EEPROM), a magnetic memory, a magnetic disk, an optical disk, or the like. The memory 1502 is any other medium that can be configured to carry or store expected program code in a structural form of an instruction or a data packet and that can be accessed by a computer. This is not limited thereto. The memory 1502 in an embodiment of the present application may alternatively be a circuit or any other device that can implement a storage function, and is configured to store program instructions and/or a data packet.

In some possible implementations, the aspects of the data packet forwarding method provided in the present application may alternatively be implemented in a form of a program product, and the program product includes a computer program. When the program product runs on the electronic device, the computer program is used to enable the electronic device to perform the steps in the data packet forwarding method that is in the various example implementations of the present application and that is described in the specification. For example, the electronic device may perform the steps shown in FIG. 5.

The program product may use any combination of one or more readable media. The readable medium may be a readable signal medium or a readable storage medium. The readable storage medium may be but is not limited to, for example, an electrical, magnetic, optical, electromagnetic, infrared, or semiconductor system, apparatus, or device, or any combination thereof. A more specific example (a non-exhaustive list) of the readable storage medium includes an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The program product in implementations of the present application may use a portable compact disk read-only memory (CD-ROM) and include a computer program, and may run on a computing apparatus. However, the program product of the present application is not limited thereto. In this document, the readable storage medium may be any tangible medium that includes or stores a program, and the program may be used by or be used in combination with a command execution system, apparatus, or device.

The readable signal medium may be included in a baseband or may be used as a data signal propagated as a part of a carrier, and carries a computer-readable program. The propagated data signal may be in a plurality of forms, including but not limited to an electromagnetic signal, an optical signal, or any suitable combination thereof. The readable signal medium may alternatively be any readable medium other than the readable storage medium, and the readable medium may send, propagate, or transmit a program used by or used in combination with a command execution system, apparatus, or device.

The computer program included in the readable medium may be transmitted by using any suitable medium, including but not limited to a wireless medium, a wired medium, an optical cable, RF, or any suitable combination thereof.

It should be noted that although several units or subunits of an apparatus are mentioned in the foregoing detailed descriptions, such division is merely an example and is not mandatory. Actually, features and functions of two or more units described above may be embodied in one unit according to implementations of the present application. Otherwise, features and functions of one unit described above may be further divided to be embodied by a plurality of units.

In addition, although the operations of the method of the present application are described in a particular order in the accompanying drawings, it is not required or implied that these operations need to be performed in the particular order, or that all of the shown operations need to be performed to implement a desired result. Additionally or alternatively, some steps may be omitted, a plurality of steps may be combined into one step to be performed, and/or one step may be decomposed into a plurality of steps to be performed.

A person skilled in the art should understand that an embodiment of the present application may be provided as a method, system, or computer program product. Therefore, the present application may use a form of a complete hardware embodiment, a complete software embodiment, or an embodiment in which a software aspect and a hardware aspect are combined. In addition, the present application may use a form of a computer program product that is implemented on one or more computer-usable storage media (including but not limited to a disk memory, a CD-ROM, and an optical memory) that each include a computer-usable computer program.

Although exemplary embodiments of the present application are described, a person skilled in the art may make other changes and modifications to these embodiments once learning of a basic creative concept. Therefore, the appended claims are intended to be construed as including the exemplary embodiments and all changes and modifications that fall within the scope of the present application.

Obviously, a person skilled in the art can make various modifications and variations to the present application without departing from the spirit and scope of the present application. In this way, the present application is also intended to include these modifications and variations, provided that these modifications and variations of the present application fall within the scope of the claims of the present application and equivalent technologies thereof.

What is claimed is:

1. A method for forwarding a data packet, comprising:
receiving a target data packet including first address information corresponding to a packet queue;
acquiring a storage status of the packet queue corresponding to the target data packet, wherein the packet queue is adapted to store data packets with address information consistent with the first address information;
storing, when the storage status of the packet queue is determined as a first state, the target data packet into a first-class block storage space corresponding to a low latency queue, wherein the first state represents a non-congestion state, the non-congestion state indicates a state where a total traffic flow of data packets stored in the packet queue is less than a traffic threshold, and the low latency queue is different from the packet queue; and
forwarding, when a first condition is met, the target data packet stored in the first class block storage space.

2. The method of claim 1, wherein the low latency queue is adapted to store data packets having different address information corresponding to different packet queues, wherein the low latency queue is different from the different packet queues.

3. The method of claim 1, wherein the first-class block storage space is allocated on an off-chip buffer.

4. The method of claim 1, wherein the step of storing, when the storage status is determined as the first state, the target data packet into the first-class block storage space corresponding to the low latency queue, further comprises:
storing a data packet of the packet queue into the first-class block storage space.

5. The method of claim 1, wherein the step of acquiring the storage status of the packet queue, comprises:
detecting the storage status of the packet queue; and
updating the storage status of the packet queue.

6. The method of claim 5, wherein the step of detecting the storage status of the packet queue, comprises:
monitoring, on schedule, the storage status of the packet queue.

7. The method of claim 6, wherein the step of monitoring, on schedule, the storage status of the packet queue, comprises:
calculating a target credit point of the packet queue, wherein the target credit point is related to a forwarding rate of the packet queue; and
determining, based on the target credit point, the storage status of the packet queue.

8. The method of claim 7, wherein the step of calculating the target credit point of the packet queue, comprises:
determining a first credit point allocated to the packet queue;
determining, when a data packet in the packet queue is forwarded, a second credit point based on a traffic flow of the forwarded data packet; and
calculating the target credit point based on the first credit point and the second credit point.

9. The method of claim 6, wherein the step of monitoring, on schedule, the storage status of the packet queue, comprises:
monitoring a remaining queue length of the packet queue; and
updating, based on the remaining queue length, the storage status of the packet queue corresponding to the target data packet.

10. The method of claim 1, wherein the step of forwarding, when the first condition is met, the target data packet stored in the first-class block storage space, comprises:
when the total traffic flow of the data packets stored in the first-class block storage space is equal to or greater than a first threshold, forwarding the target data packet.

11. The method of claim 1, wherein the step of forwarding, when the first condition is met, the target data packet stored in the first-class block storage space, comprises:
forwarding, on schedule, the target data packet stored in the first-class block storage space.

12. The method of claim 1, wherein the step of forwarding, when the first condition is met, the target data packet stored in the first-class block storage space, comprises:
detecting first buffer description BD information corresponding to the low latency queue; and
when the first BD information is determined as valid, forwarding the target data packet stored in the first-class block storage space.

13. The method of claim 1, wherein the method further comprises:
storing, when the storage status is determined as a second state, the target data packet into a second-class block storage space corresponding to the packet queue, wherein the second state represents a congestion state; and
forwarding, when a second condition is met, the target data packet stored in the second-class block storage space.

14. The method of claim 13, wherein the step of forwarding, when the second condition is met, the target data packet stored in the second-class block storage space, comprises:
when a total traffic flow of data packets stored in the second-class block storage space is equal to or greater than a second threshold, forwarding the target data packet stored in the second-class block storage space.

15. The method of claim 13, wherein the step of forwarding, when the second condition is met, the target data packet stored in the second-class block storage space, comprises:
when the storage status of the packet queue is determined as being switched from the second state to the first state, forwarding the target data packet stored in the second-class block storage space.

16. The method of claim 13, wherein the first-class block storage space is not greater than the second-class block storage space.

17. An electronic device, including a processor and a memory, wherein program code is stored on the memory, and when the program code is executed by the processor, the processor is enabled to perform:
receiving a target data packet including first address information corresponding to a packet queue;
acquiring a storage status of the packet queue corresponding to the target data packet, wherein the packet queue is adapted to store data packets with address information consistent with the first address information;
storing, when the storage status of the packet queue is determined as a first state, the target data packet into a first-class block storage space corresponding to a low latency queue, wherein the first state represents a non-congestion state, the non-congestion state indicates a state where a total traffic flow of data packets stored in the packet queue is less than a traffic threshold, and the low latency queue is different from the packet queue; and
forwarding, when a first condition is met, the target data packet stored in the first class block storage space.

18. A non-transitory computer-readable storage medium, including program code, wherein when the program code is executed on an electronic device, the program code is configured to enable the electronic device to perform:

receiving a target data packet including first address information corresponding to a packet queue;

acquiring a storage status of the packet queue corresponding to the target data packet, wherein the packet queue is adapted to store data packets with address information consistent with the first address information;

storing, when the storage status of the packet queue is determined as a first state, the target data packet into a first-class block storage space corresponding to a low latency queue, wherein the first state represents a non-congestion state, the non-congestion state indicates a state where a total traffic flow of data packets stored in the packet queue is less than a traffic threshold, and the low latency queue is different from the packet queue; and forwarding, when a first condition is met, the target data packet stored in the first class block storage space.

\* \* \* \* \*